(12) United States Patent
Bhat et al.

(10) Patent No.: US 11,489,479 B2
(45) Date of Patent: Nov. 1, 2022

(54) OPEN LOAD DIAGNOSTICS FOR LOADS THAT ARE PWM CONTROLLED

(71) Applicant: Cummins Inc., Columbus, IN (US)

(72) Inventors: Subramanya Bhat, Udupi (IN); Santosh Shankar Koli, Pune (IN); Shashi Kanth Belde, Columbus, IN (US); Abu Musa, Greenwood, IN (US)

(73) Assignee: Cummins Inc., Columbus, IN (US)

( * ) Notice: Subject to any disclaimer, the term of this patent is extended or adjusted under 35 U.S.C. 154(b) by 319 days.

(21) Appl. No.: 16/634,399

(22) PCT Filed: Aug. 3, 2017

(86) PCT No.: PCT/US2017/045300
§ 371 (c)(1),
(2) Date: Jan. 27, 2020

(87) PCT Pub. No.: WO2019/027461
PCT Pub. Date: Feb. 7, 2019

(65) Prior Publication Data
US 2021/0091705 A1   Mar. 25, 2021

(51) Int. Cl.
*H02P 29/024* (2016.01)
*H02H 7/08* (2006.01)

(52) U.S. Cl.
CPC ......... *H02P 29/024* (2013.01); *H02H 7/0838* (2013.01)

(58) Field of Classification Search
CPC ............................ H02P 29/024; H02H 7/0838
See application file for complete search history.

(56) References Cited

U.S. PATENT DOCUMENTS

| | | | |
|---|---|---|---|
| 5,438,286 A | 8/1995 | Pavlin et al. | |
| 5,592,097 A | 1/1997 | Shimizu et al. | |
| 5,774,321 A | 6/1998 | Kim et al. | |
| 6,512,346 B2* | 1/2003 | Yoshimura | H02P 7/29 318/434 |
| 8,508,214 B2 | 8/2013 | Kutzner et al. | |
| 2007/0001643 A1* | 1/2007 | Buerk | H02P 29/02 318/811 |
| 2008/0259515 A1 | 10/2008 | Turpin et al. | |
| 2014/0253078 A1* | 9/2014 | Nishio | G01R 31/40 323/282 |
| 2015/0340978 A1 | 11/2015 | Seo et al. | |

OTHER PUBLICATIONS

International Search Report and Written Opinion for International Application No. PCT/US2017/045300, dated Oct. 24, 2017, 7 pages.

* cited by examiner

Primary Examiner — Scott Bauer
(74) Attorney, Agent, or Firm — Foley & Lardner LLP

(57) ABSTRACT

Methods and apparatuses for detecting an open load condition for a load. The load is coupled to a power source at a high side and to a ground at a low side through at least one switch, the load has a first end and a second end, a first voltage at the first end is kept constant. A switch is controlled by a PWM signal. After the switch is turned off by the PWM signal, the voltage associated with the second end of the load is measured. In one embodiment, a change of the second voltage during a predefined delay is compared with a predefined voltage threshold. In another embodiment, the time it takes for the change of the second voltage to reach a predefined voltage threshold is compared with a predefined time threshold.

14 Claims, 9 Drawing Sheets

| Motor Direction | HS1_Q1 | HS2_Q2 | LS1_Q3 | LS2_Q4 |
|---|---|---|---|---|
| Forward | ON | Freewheeling | OFF | PWMING |
| Reverse | Freewheeling | ON | PWMING | OFF |

FIG. 2

OPEN LOAD DIAGNOSTICS FOR LOADS THAT ARE PWM CONTROLLED

TECHNICAL FIELD

The present disclosure generally relates to load control using pulse width modulation (PWM).

BACKGROUND

Load control using pulse width modulation (PWM) has various applications, for example, being utilized in an electronic stability program (ESP) or an anti-skid braking (ABS) system. The ESP or ABS system can selectively operate front, rear, left, and right clutched wheels to prevent a skid of a vehicle occurring under acceleration, braking, driver's mistakes, etc. The ESP or ABS system can output a PWM signal to drive a load (e.g., motor), wherein the duty ratio of the PWM signal can determine a discharge rate of a hydraulic valve for vehicle braking. Degradation or faults in the motor can contribute to motor failures and even ESP or ABS system failures. In order to avoid or mitigate breakdown of the system, load faults need to be detected. Systems and methods for improving load faults detection are generally desired.

SUMMARY

One embodiment relates to an apparatus for detecting an open load condition for a load. The load is coupled to a power source and to a ground through at least one switch. The load has a first end and a second end, wherein a first voltage at the first end is kept constant. The apparatus is structured to output a pulse width modulation (PWM) signal to selectively turn on or off a first switch of the at least one switch. The apparatus uses the PWM signal to turn off the first switch at a first time point, determines a second voltage associated with the second end of the load after a predefined delay from the first time point, and determines whether a change of the second voltage during the predefined delay is less than a predefined threshold voltage. In response to determining that the change is less than the predefined threshold voltage, the apparatus determines that the open load condition exists for the load.

Another embodiment relates to an apparatus for detecting an open load condition for a load. The load is coupled to a power source and to a ground through at least one switch. The load has a first end and a second end, wherein a first voltage at the first end is kept constant. The apparatus is structured to output a pulse width modulation (PWM) signal to selectively turn on or off a first switch of the at least one switch. The apparatus uses the PWM signal to turn off the first switch at a first time point, and determine whether a change of a second voltage associated with the second end of the load since the first time point has reached a predefined threshold voltage. In response to determining that the change has reached the predefined threshold voltage, the apparatus determines a time period for the change to reach the predefined threshold voltage since the first time point, and determines whether the time period is greater than a predefined threshold time period. In response to determining that the time period is greater than the predefined threshold time period, the apparatus determines that the open load condition exists for the load.

Another embodiment relates to a method for detecting an open load condition for a load. The load is coupled to a power source and to a ground through at least one switch. The load has a first end and a second end, wherein a first voltage at the first end is kept constant. The method comprises outputting a pulse width modulation (PWM) signal to selectively turn on or off a first switch of the at least one switch, using the PWM signal to turn off the first switch at a first time point, determining a second voltage associated with the second end of the load after a predefined delay from the first time point, and determining whether a change of the second voltage during the predefined delay is less than a predefined threshold voltage. The method further comprises in response to determining that the change is less than the predefined threshold voltage, determining that the open load condition exists for the load.

Yet another embodiment relates to method for detecting an open load condition for a load. The load is coupled to a power source and to a ground through at least one switch. The load has a first end and a second end, wherein a first voltage at the first end is kept constant. The method comprises outputting a pulse width modulation (PWM) signal to selectively turn on or off a first switch of the at least one switch, using the PWM signal to turn off the first switch at a first time point, and determining whether a change of a second voltage associated with the second end of the load since the first time point has reached a predefined threshold voltage. The method also comprises in response to determining that the change has reached the predefined threshold voltage, determining a time period for the change to reach the predefined threshold voltage since the first time point, and determining whether the time period is greater than a predefined threshold time period. The method further comprises in response to determining that the time period is greater than the predefined threshold time period, determining that the open load condition exists for the load.

These and other features, together with the organization and manner of operation thereof, will become apparent from the following detailed description when taken in conjunction with the accompanying drawings.

BRIEF DESCRIPTION OF DRAWINGS

FIG. 2 is a table of switch states for the open load detection system of FIG. 1A, according to an example embodiment.

DETAILED DESCRIPTION

Figure 1A:
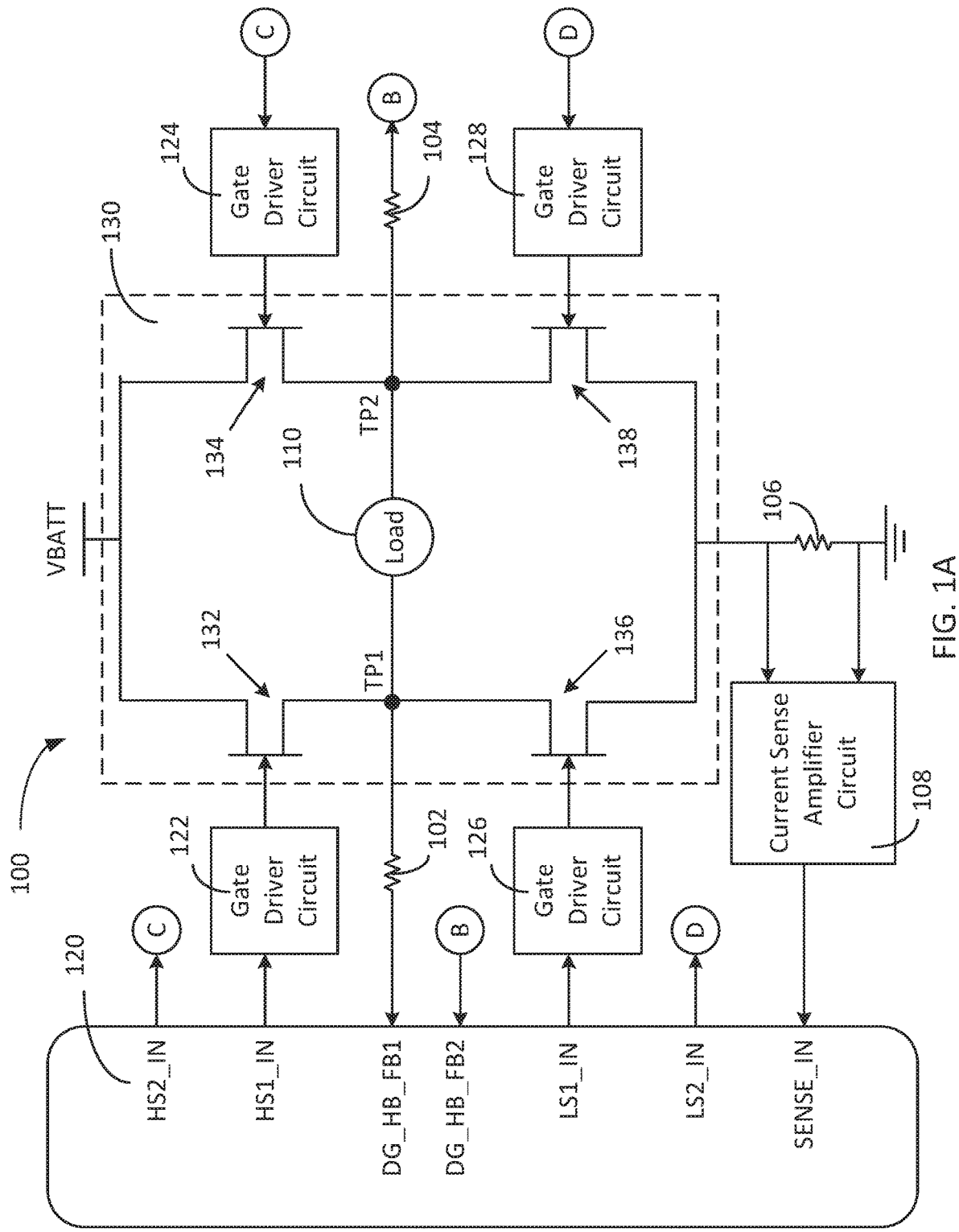
FIG. 1A is a schematic diagram of an open load detection system, according to a first example embodiment.

For the purpose of promoting an understanding of the principles of the disclosure, reference will now be made to the embodiments illustrated in the drawings and specific language will be used to describe the same. It will nevertheless be understood that no limitation of the scope of the disclosure is thereby intended, any alternations and further modifications in the illustrated embodiments, and any further applications of the principles of the disclosure as illustrated therein as would normally occur to one skilled in the art to which the disclosure relates are contemplated herein.

Referring to the Figures generally, the various embodiments disclosed herein relate to systems and methods for detecting open load condition for a load controlled by pulse width modulation (PWM). The load is coupled to a power source at a high side and to the ground at a low side through at least one switch. In some embodiments, the switches form an H-bridge configuration. A microcontroller can control a PWM driver or Freewheeling driver to selectively open or close the switches. The PWM driver and Freewheeling driver are not on at the same time. The time difference between turning off the PWM driver and turning on the Freewheel driver, or the time difference between turning off the Freewheel driver and turning on the PWM driver is called dead time. The load has a first end and a second end, wherein a first voltage at the first end is kept constant. During the dead time, a second voltage at the second end of the load can rise from substantially zero (0) volt towards the voltage of the power source. If the open load condition is present (e.g., the resistance of the load is larger than a predefined threshold), the second voltage at the second end would not rise as much as when the load is normal (i.e., no open load condition) during a predefined period of time. Thus, the microcontroller can determine whether open load condition exists by measuring the second voltage after the predefined period of time. In another embodiment, if the open load condition is present, it takes longer time for the second voltage to rise from zero to a predefined voltage threshold than when the load is normal. Thus, the microcontroller can determine whether open load condition exists by measure how long it takes for the second voltage to rise to the predefined voltage threshold.

Referring now to FIG. 1A, a schematic diagram of a system 100 for detecting open load condition for a load 110 controlled by PWM is shown according to a first example embodiment. The system 100 may be used in an electronic stability program (ESP) or anti-skid braking (ABS) system installed on an equipment. The equipment may be, for example, vehicles including on-road vehicles (e.g., trucks, buses, etc.), off-road vehicles (e.g., four-wheelers, all-terrain vehicle, tractors, lawn mowers, snowmobiles), marine vessels (e.g., ships, submarines, boats, yachts, cruise ships), construction equipment (e.g., concrete trucks, hand-operated tools, loaders, boom lifts), mining equipment (e.g., mobile mining crushers, dozers, loaders), oil and gas equipment (e.g., drilling apparatuses, dozers, loaders, rigs), or any other type of vehicles. The ESP or ABS system can selectively operate front, rear, left, and right clutched wheels to prevent a skid of the vehicle occurring under acceleration, braking, driver's mistakes, etc. The system 100 may also be used in connection with consumer or industrial products.

The system 100 is shown to include a microcontroller 120 configured to control an H-bridge 130 of switches coupled to the load 110. The H-bridge 130 includes a first switch 132 (also called HS1_Q1) and a second switch 134 (also called HS2_Q2) on a high side, and a third switch 136 (also called LS1_Q3) and a fourth switch 138 (also called LS2_Q4) on a low side. As used herein, the "high side" refers to the side connected to a power source (e.g., battery with a voltage of VBATT) and thus sourcing current to the load 110. The power source may supply power for operating the load 110. As used herein, the "low side" refers to the side connected to a ground and thus sinking current from the load 110.

The load 110 may be a motor connected to and operating, for example, a hydraulic pump (not shown in the present Figure) which pumps a brake fluid discharged from a wheel cylinder. The load 110 has a first end TP1 and a second end TP2, wherein the first end TP1 is connected to a point between the first switch 132 and the third switch 136 and the second end TP2 is connected to a point between the second switch 134 and the fourth switch 138. In order to establish a polarity convention for the ease of explanation, when a current flows through the load 110 from TP1 to TP2, the motor direction is defined herein as being "Forward." Similarly, when a current flows through the load 110 from TP2 to TP1, the motor direction is defined herein as being "Reverse."

The microcontroller 120 is configured to control a first gate driver circuit 122 for driving the first switch 132, a second gate driver circuit 124 for driving the second switch 134, a third gate driver circuit 126 for driving the third switch 136, and a fourth gate driver circuit 128 for driving the fourth switch 138. The gate driver circuits 122 through 128 are connected to gates of switches 132 through 138 and can selectively turn on or off switches 132 through 138, respectively, according to the control signals (e.g., PWM signals) output from the microcontroller 120. Although switches 132 through 138 are shown to be MOSFETs, it should be understood that other controllable switching elements may be utilized.

The microcontroller 120 may include a programmable logic circuit formed on a semiconductor chip, such as a field programmable gate array (FPGA), a programmable logic device (PLD), a programmable logic array (PLA), or the like. The microcontroller 120 may include a plurality of pins configured to carry (i.e., transmit and/or receive) signals. As shown, the microcontroller 120 includes a "HS1_IN" pin coupled to the first gate driver circuit 122, a "HS2_IN" pin coupled to the second gate driver circuit 124, a "LS1_IN" pin coupled to the third gate driver circuit 126, and a "LS2_IN" pin coupled to the fourth gate driver circuit 128. The microcontroller 120 can output control signals to gate driver circuits 122 through 128 via corresponding pins. The time sequences of the control signals to each gate driver circuit will be discussed in detail below with reference to FIGS. 2-4.

As shown in FIG. 1A, the microcontroller 120 further includes a "DG_HB_FB1" pin coupled to TP1 via a first drain to gate feedback resistor 102 coupled in series with the load 110 at the first end TP1 of the load 110. Through the "DG_HB_FB1" pin, the microcontroller 120 can receive signal indicative of a first voltage at the first end TP1 of the load 110. Similarly, the microcontroller 120 includes a "DG_HB_FB2" pin coupled to TP2 via a second drain to gate feedback resistor 104 coupled in series with the load 110 at the second end TP2 of the load 110. Through the "DG_HB_FB2" pin, the microcontroller 120 can receive signal indicative of a second voltage at the second end TP2 of the load 110. The microcontroller 120 further includes a "SENSE_IN" pin coupled to a current sense amplifier circuit 108 connected in parallel with a sensing resistor 106 for sensing the current flowing through the resistor 106. Through the "SENSE_IN" pin, the microcontroller 120 can receive signal indicative of the current flowing through the load 110.

It should be understood that the structure of the system 100 as well as the pin arrangements of the microcontroller 120 are illustrated by way of example only and not by way of limitation; any suitable circuits and pin arrangement can be used for the present disclosure. It should be also understood that the H-bridge configuration is used herein as an example for illustration. The system for detecting open load conditions can have other configurations. Referring to FIGS. 1B through 1E, various open load systems are shown according to example embodiments.

Figure 1B:
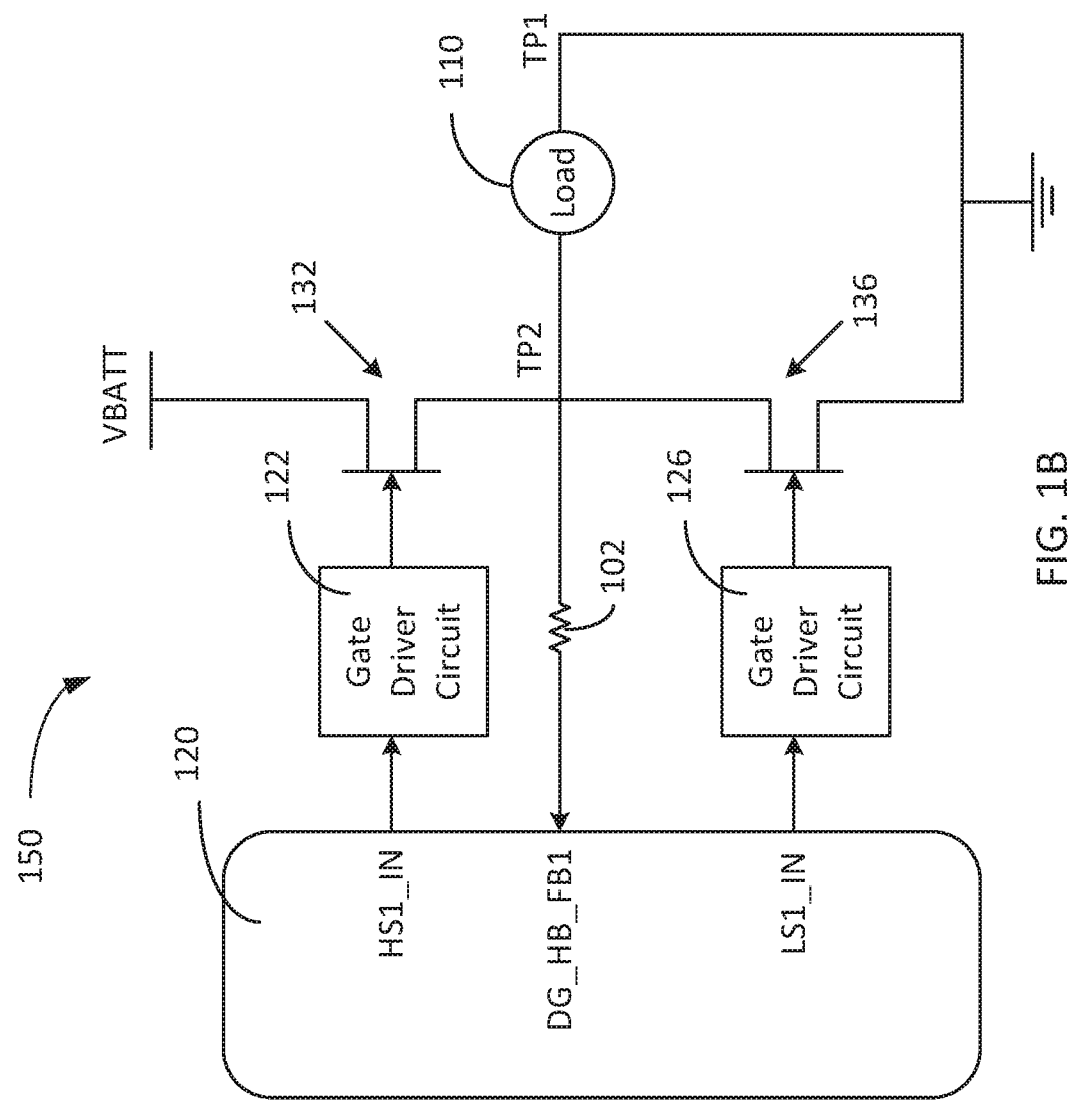
FIG. 1B is a schematic diagram of an open load detection system, according to a second example embodiment.

FIG. 1B shows an open load detection system 150, according to a second example embodiment. The system 150 includes a half of the H-bridge configuration, i.e., the switches 132 and 136, but not the switches 134 and 138. The first end TP1 of the load 110 is connected directly to the ground, and the second end TP2 is connected to a point between the switches 132 and 136.

Figure 1D:
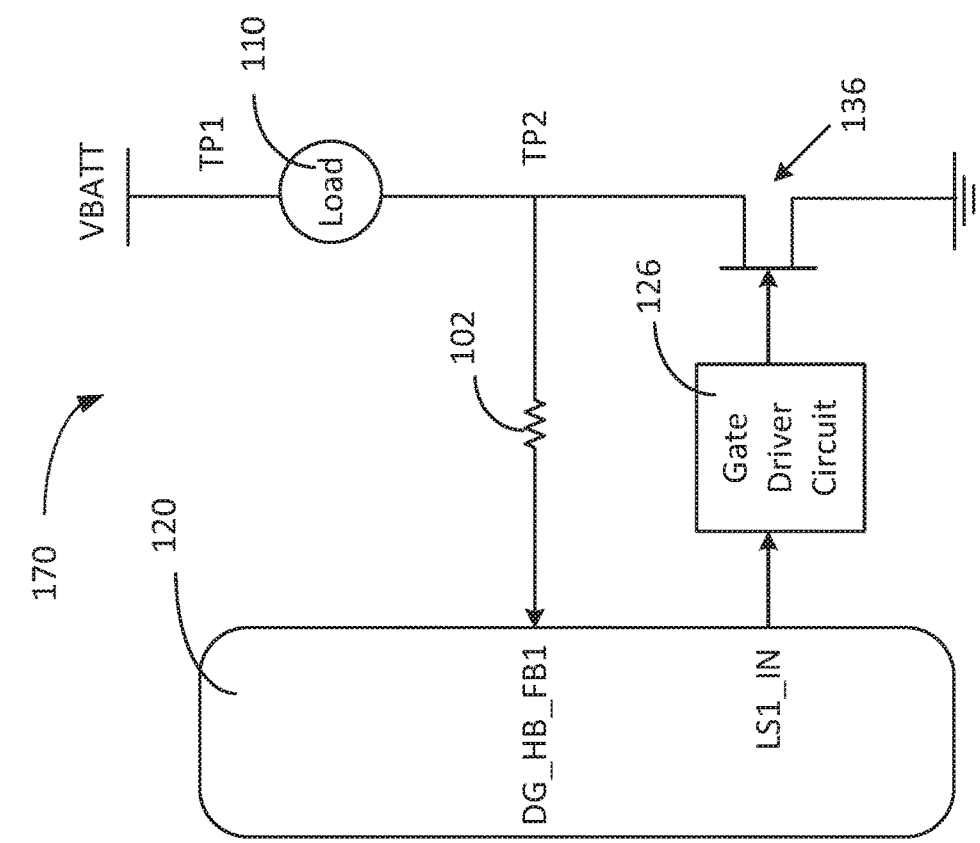
FIG. 1D is a schematic diagram of an open load detection system, according to a fourth example embodiment.
Figure 1C:
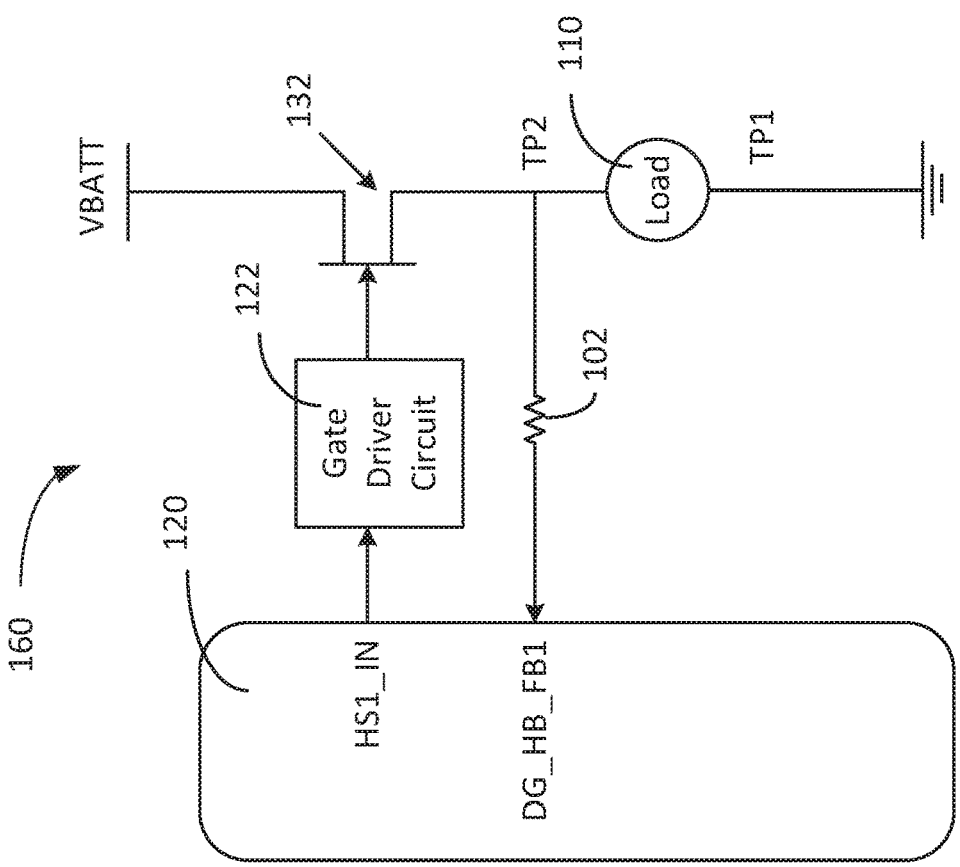
FIG. 1C is a schematic diagram of an open load detection system, according to a third example embodiment.

FIG. 1C shows an open load detection system 160, according to a third example embodiment. The system 160 includes only the first high side switch 132. The first end TP1 of the load 110 is connected directly to the ground, and the second end TP2 is connected to the power source through the switch 132.

FIG. 1D shows an open load detection system 170, according to a fourth example embodiment. The system 170 includes only the first load side switch 136. The first end TP1 of the load 110 is connected directly to the power source, and the second end TP2 is connected to the ground through the switch 136.

Figure 1E:
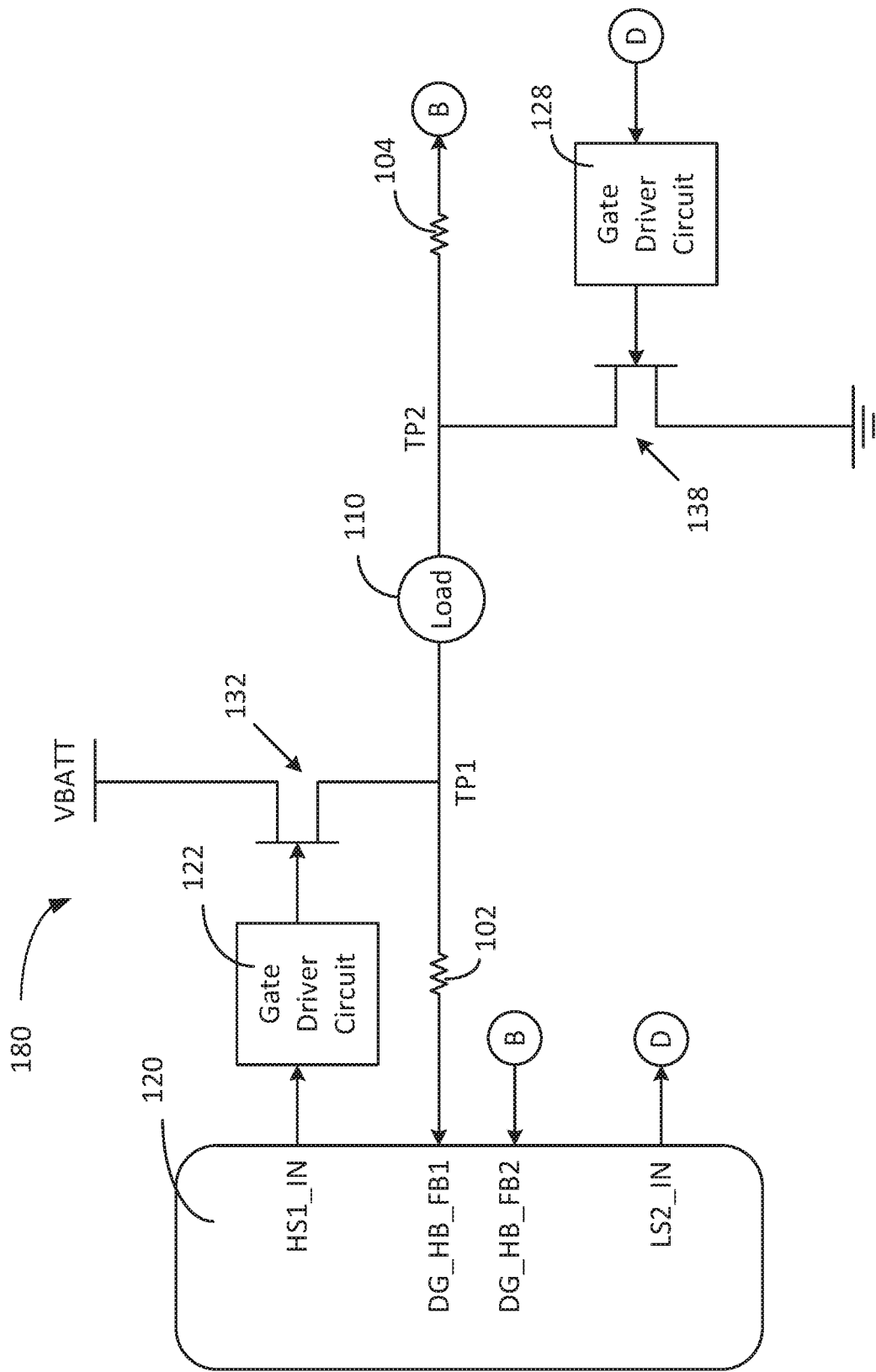
FIG. 1E is a schematic diagram of an open load detection system, according to a fifth example embodiment.

FIG. 1E shows an open load detection system 180, according to a fifth example embodiment. The system 180 includes a high side-low side pair, i.e., the switch 132 at the high side and the switch 138 at the low side. The first end TP1 of the load 110 is connected to the power source through the switch 132, and the second end TP2 is connected to the ground through the switch 138.

Referring to FIG. 2, a table of switch states for the open load detection system 100 of FIG. 1A is shown according to an example embodiment. As discussed above, in order to establish a polarity convention, when a current flows through the load 110 from TP1 to TP2, the motor direction is defined as "Forward." When a current flows through the load 110 from node TP2 to node TP1, the motor direction is defined as "Reverse."

For the "Forward" direction, the first switch 132 (i.e., HS1_Q1) is on, the second switch (i.e., HS2_Q2) is freewheeling, the third switch (i.e., LS1_Q3) is off, and the fourth switch (i.e., LS2_Q4) is PWMing. The microcontroller 120 outputs a signal to the first gate driver circuit 122 through the HS1_IN pin, which drives the gate driver circuit 122 to output a high voltage to the gate of the first switch 132 and thus the first switch 132 is on. The microcontroller 120 outputs a signal to the third gate driver circuit 126 through the LS1_IN pin, which drives the gate driver circuit 126 to output a low voltage to the gate of the third switch 136 and thus the third switch 136 is off. The microcontroller 120 outputs a PWM signal to the fourth gate driver circuit 128. The PWM signal makes the fourth gate driver circuit 128 output alternating high and low voltages to the fourth switch 138. When the voltage is high, the fourth switch is turned on and current flows from VBATT, the first switch 132, the load 110, and the fourth switch 138 to the ground. When the voltage is low, the fourth switch 138 is turned off. A duty cycle describes the amount of time the signal is in a high (i.e., on) state as a percentage of the total time of a complete cycle. The microcontroller 120 outputs a Freewheeling signal to the second switch 134. The Freewheeling signal makes the second gate driver circuit 124 output alternating high and low voltages to the second switch 134. For example, when the fourth switch 128 is turned off by the PWM signal, the load 110, which is an inductor type, would attempt to resist the sudden drop of current by using its stored magnetic field energy to create its own voltage. The result is that, the second voltage at the second end TP2 of the load 110 rises from substantial zero to catch up the first voltage at the first end TP1 (i.e., VBATT). By turning on the second switch 134 for freewheeling, the load 110 is allowed to draw current from itself in a continuous loop until the energy is dissipated. The PWM signal and the Freewheeling signal are not on at the same time. The time difference between turning off the PWM driver and turning on the Freewheel driver, or the time difference between turning off the Freewheel driver and turning on the PWM driver is called dead time.

For the "Reverse" direction, the first switch 132 (i.e., HS1_Q1) is freewheeling, the second switch (i.e., HS2_Q2) is on, the third switch (i.e., LS1_Q3) is PWMing, and the fourth switch (i.e., LS2_Q4) is off. The microcontroller 120 outputs a signal to the second gate driver circuit 124 through the HS2_IN pin, which drives the gate driver circuit 124 to output a high voltage to the gate of the second switch 134 and thus the second switch 134 is on. The microcontroller 120 outputs a signal to the fourth gate driver circuit 138 through the LS2_IN pin, which drives the gate driver circuit 128 to output a low voltage to the gate of the fourth switch 138 and thus the fourth switch 138 is off. The microcontroller 120 outputs a PWM signal to the third gate driver circuit 136. The PWM signal instructs the third gate driver circuit 126 to output alternating high and low voltages to the third switch 136. When the voltage is high, the third switch is turned on and current flows from VBATT, the second switch 134, the load 110, and the third switch 136 to the ground. When the voltage is low, the third switch 136 is turned off. The microcontroller 120 outputs a Freewheeling signal to the first gate driver circuit 122. The Freewheeling signal instructs the first gate driver circuit 122 to output alternating high and low voltages to the first switch 132. For example, when the third switch 128 is turned off by the PWM signal, the load 110, which is an inductor type, would attempt to resist the sudden drop of current by using its stored magnetic field energy to create its own voltage. The result is that, the first voltage at the first end TP1 of the load 110 rises from substantial zero to catch up the second voltage at the second end TP2 (i.e., VBATT). By turning on the first switch 132 for freewheeling, the load 110 is allowed to draw current from itself in a continuous loop until the energy is dissipated. The PWM signal and the Freewheeling signal are not on at the same time.

Figure 3:
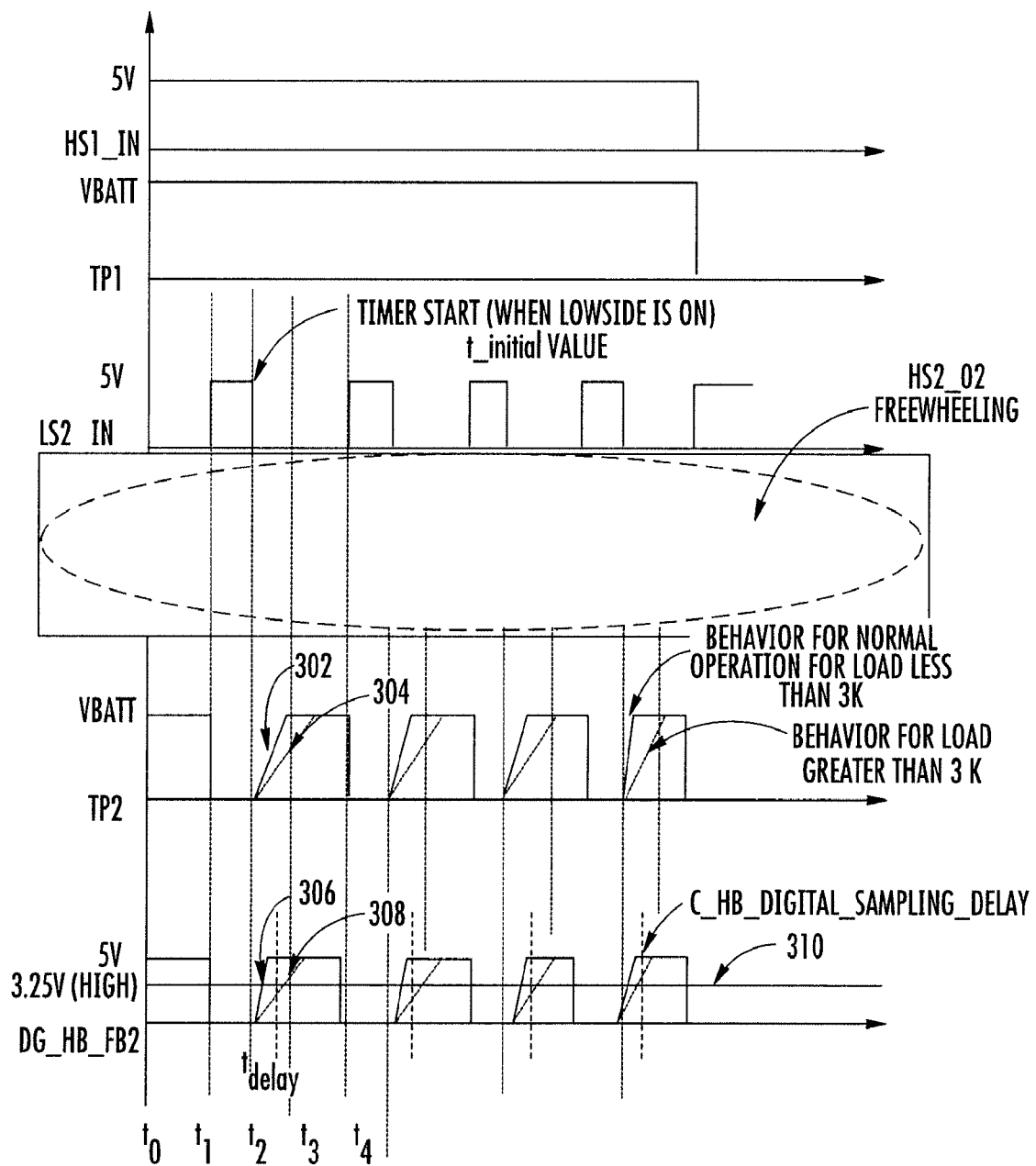
FIG. 3 is a waveform graph illustrating a first method for open load detection, according to an example embodiment.

Referring to FIG. 3, a waveform graph illustrating a first method for open load detection for the system 100 of FIG. 1A is shown, according to an example embodiment. The embodiment shown in FIG. 3 assumes the motor direction is "Forward."

The first line in FIG. 3 is the waveform of voltage on the "HS1_IN" pin, which is 5 V all the time, so that the switch 132 is at the on state.

The second line is the waveform of the first voltage at the first end TP1 of the load 110. Because the switch 132 is on, voltage drop on the switch 132 is negligible with respect to voltage VBATT of the power source. Thus, the voltage at node TP1 is kept constant at substantially VBATT.

The third line is the waveform of voltage at the "LS2_IN" pin, which follows a PWM pattern. The fourth line is the waveform of voltage at the "HS2_IN" pin, which follows a Freewheeling pattern. The fifth line is the waveform of the second voltage at the second end TP2 of the load 110, which changes with the voltages at the "LS2_IN" pin and the "HS2_IN" pin. The sixth line is the waveform of voltage received at the "DG_HB_FB2" pin, which changes with the second voltage at TP2.

Between times $t_0$ and $t_1$, the PWM signal at "LS2_IN" pin is low, which turns off the fourth switch 138. The Freewheeling signal at "HS2_IN" pin is high, which turn on the second switch 134. Because the switch 134 is on, voltage drop on the switch 134 is negligible with respect to voltage VBATT of the power source. Thus, the voltage at node TP2 is substantially VBATT. The voltage received at "DG_HB_FB2" pin is the second voltage at TP2 minus voltage drop at the resistor 104, which substantially follows the second voltage at TP2.

Between times $t_1$ and $t_2$, The Freewheeling signal at "HS2_IN" pin is low, which turns off the second switch 134. The PWM signal at "LS2_IN" pin is high, which turns on the fourth switch 138 so that current flows from VBATT through switch 132, load 110, and switch 138 to the ground. Because the switch 138 is on, voltage drop on the switch 138 is negligible and the second voltage at TP2 is substantially the ground voltage, i.e., 0 V. The voltage received at "DG_HB_FB2" pin is also substantially 0 V.

Between time $t_2$ and $t_3$, the PWM signal at "LS2_IN" pin is low, which turns off the fourth switch 138. However, the Freewheeling signal at "HS2_IN" pin is also low, which has not turned on the second switch 134. This period of time is called "dead time." After the fourth switch 138 is turned off by the PWM signal, the load 110, which is an inductor type, uses its stored magnetic field energy to create a voltage to resist the sudden drop of current. Thus the second voltage at TP2 starts to increase from substantially 0 V towards VBATT to catch up the first voltage at TP1. The larger the resistance of the load 110 is, the slower the voltage at node TP2 reaches VBATT. The line 302 shows the change of the second voltage at TP2 when the resistance of the load 110 is normal, for example, less than 3 kΩ. The line 304 shows the change of the second voltage at TP2 when the load 110 is open, for example, the resistance of load 110 is larger than 3 k/Ω. The voltage at "DG_HB_FB2" pin follows the change of the second voltage at node TP2. The line 306 shows the change of voltage at "DG_HB_FB2" pin when the resistance of the load 110 is normal, for example, less than 3 kΩ. The curve 308 shows the change of voltage at "DG_HB_FB2" pin when the load 110 is open, for example, the resistance of load 110 is larger than 3 kΩ.

At time $t_3$, the PWM signal at "LS2_IN" pin remains low, which keeps the fourth switch 138 off. The Freewheeling signal at "HS2_IN" pin is high, which turns on the second switch 134. And a new cycle begins. In other words, from time $t_3$, the PWM and Freewheeling patterns repeat those between $t_0$ and $t_3$, for example, at time $t_4$, the PWM and Freewheeling patterns are the same at at time $t_2$, and so on.

In the first method for open load detection, the microcontroller 120 determines whether the voltage at "DG_HB_FB2" pin has reached a predefined voltage threshold 310 after a predefined period of time (i.e., delay) from the start of dead time. In particular, as shown in FIG. 3, the dead time starts at time $t_2$. The predefined period of time is shorter than the duration of the dead time. The predefined period of time is from time $t_2$ to $t_{delay}$, wherein time $t_{delay}$ is before time $t_3$. In some embodiments, the predefined delay is 15 μs. As discussed above, the voltage at "DG_HB_FB2" pin rises faster when the resistance of the load 110 is normal than when open load condition exists. Thus, at time $t_{delay}$, if the load 110 is normal (i.e., no open load condition exists), the voltage at "DG_HB_FB2" pin may have reached the maximum, e.g., 5 V. If the open load condition exists for the load 110, the voltage at "DG_HB_FB2" pin may be substantially lower than the maximum. A predefined voltage threshold 310 may be chosen as, for example, 3.25 V. If at time $t_{delay}$, the voltage at "DG_HB_FB2" pin is larger than the predefined voltage threshold 310, the microcontroller 120 determines that the load 110 is normal. If at time $t_{delay}$, the voltage at "DG_HB_FB2" pin is equal to or smaller than the predefined voltage threshold 310, the microcontroller 120 determines that open load condition exists for the load 110. It should be understood that although the Forward direction is used herein as an example for illustration, the method can be used for open load detection in Reverse direction as well.

The values of the predefined delay ($t_{delay}$) and the predefined voltage threshold 310 can be retrieved from memory, adaptively determined by the microcontroller 120 or an external system or device, specified by a user, or received from any other data source. In some embodiments, the values of the parameters can be selected using knowledge of the parameters of the electrical circuit.

Figure 4:
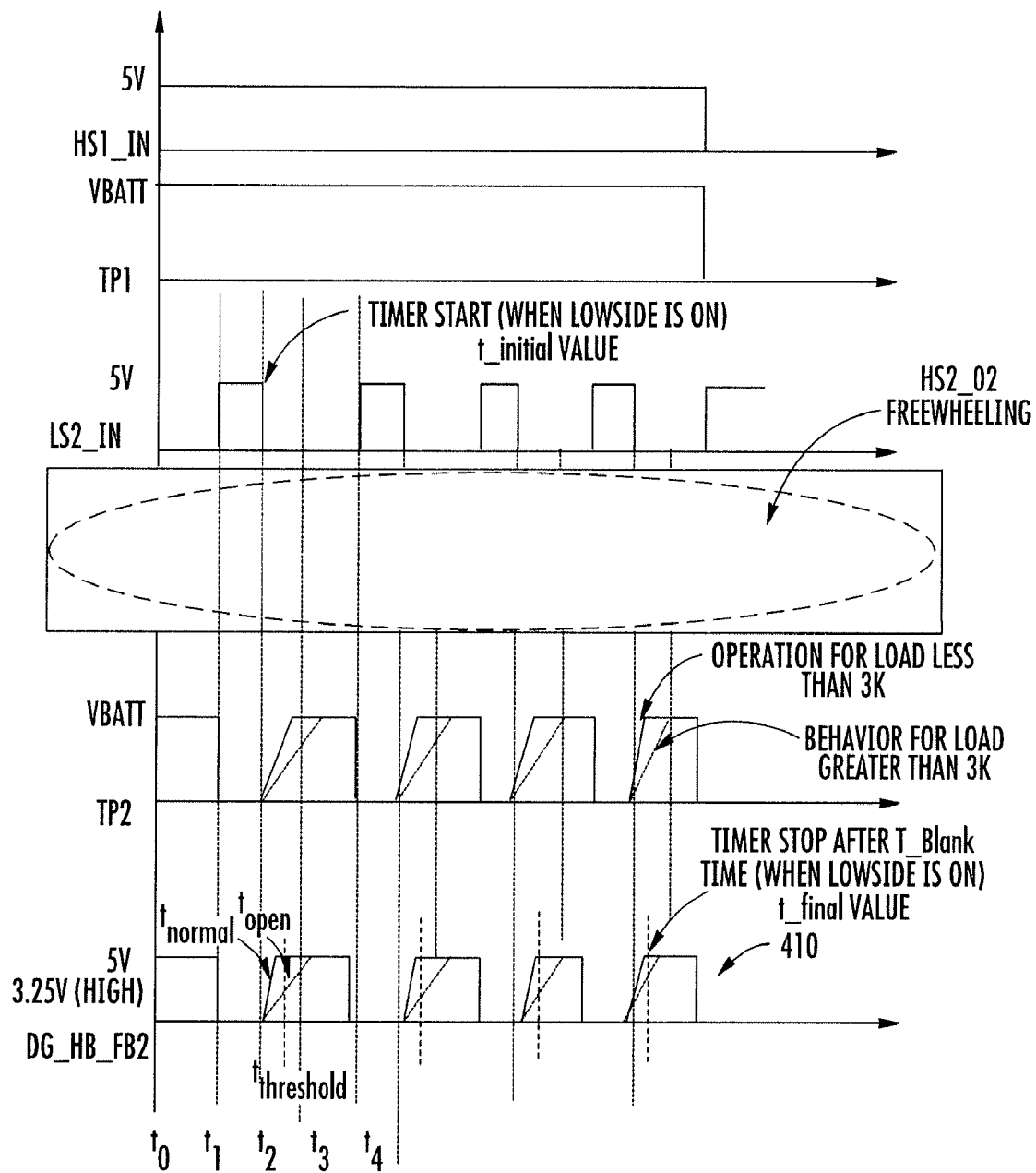
FIG. 4 is a waveform graph illustrating a second method for open load detection, according to an example embodiment.

Referring to FIG. 4, a waveform graph illustrating a second method for open load detection for the system 100 of FIG. 1A is shown, according to an example embodiment. The embodiment shown in FIG. 4 assumes the motor direction is "Forward."

The PWM and Freewheeling patterns may be the same as the first method. Between times $t_0$ and $t_1$, the PWM signal at "LS2_IN" pin is low, which turns off the fourth switch 138. The Freewheeling signal at "HS2_IN" pin is high, which turn on the second switch 134. Between times $t_1$ and $t_2$, The Freewheeling signal at "HS2_IN" pin is low, which turn off the second switch 134. The PWM signal at "LS2_IN" pin is high, which turns on the fourth switch 138 so that current flows from VBATT through switch 132, load 110, and switch 138 to the ground. Between time $t_2$ and $t_3$, the PWM signal at "LS2_IN" pin is low, which turns off the fourth switch 138. However, the Freewheeling signal at "HS2_IN" pin is also low, which has not turned on the second switch 134. This period of time is called "dead time." At time $t_3$, the PWM signal at "LS2_IN" pin remains low, which keeps the fourth switch 138 off. The Freewheeling signal at "HS2_IN" pin is high, which turn on the second switch 134. And a new cycle begins. In other words, from time $t_3$, the PWM and Freewheeling patterns repeat those between $t_0$ and $t_3$, for example, at time $t_4$, the PWM and Freewheeling patterns are the same at time $t_2$, and so on.

What is different in the second method is the period of time for reaching a predefined voltage threshold 410 rather than the voltage achieved after a predefined period of time is used to determine whether open load condition exists. In the second method for open load detection, the microcontroller 120 determines whether the time period it takes for the voltage at "DG_HB_FB2" pin to reach a predefined voltage from the start of dead time is greater than a predefined time threshold. In particular, as shown in FIG. 4, the dead time starts at time $t_2$. The microcontroller 120 may record an initial time stamp at time $t_2$. A predefined voltage threshold 410 can be set, which is smaller than the maximum voltage, e.g., 5 V. The microcontroller 120 continually determines whether the voltage at the "DG_HB_FB2" pin has reached the predefined voltage threshold 410. The microcontroller 120 may record a final time stamp at the point when the voltage at the "DG_HB_FB2" pin reaches the predefined voltage threshold 410. The microcontroller 120 may determine the time it takes for the voltage at the "DG_HB_FB2" to reach the predefined voltage threshold 410 by, for example, calculating the difference between the initial time stamp and the final time stamp. As discussed above, it takes shorter time to reach the predefined voltage threshold 410 when the load 110 is normal than when there is open load condition. A predefined time threshold 410 may be chosen. If the time period it takes for the voltage at "DG_HB_FB2" pin to reach the predefined voltage threshold 410 is smaller than the predefined time threshold, the microcontroller 120 determines that the load 110 is normal. If the time period it takes for the voltage at "DG_HB_FB2" pin to reach the predefined voltage threshold 410 is equal to or larger than the predefined time threshold, the microcontroller 120 determines that the load 110 is normal.

The values of the predefined delay and the predefined voltage threshold 410 can be retrieved from memory, adaptively determined by the microcontroller 120 or an external system or device, specified by a user, or received from any other data source. In some embodiments, the values of the parameters can be selected using knowledge of the parameters of the electrical circuit. In an example, for a load with a resistance greater than 2.5 KΩ, the open load detection time threshold $t_{OI_{threshold}}$=9 μs. For an example normal load condition, $t_{final}-t_{initial}$=1.6 μs, which is less than $t_{OI_{threshold}}$=9 μs. This means there is no open load fault condition. For an example open load condition of 3 KΩ load resistance, $t_{final}-t_{initial}$=10.2 μs, which is greater than $t_{OI_{threshold}}$=9 μs. This means there is open load fault condition.

It should be understood that although the Forward direction is used herein as an example for illustration, the method can be used for open load detection in Reverse direction as well. It should also be understood that although the first and second methods are explained with reference to the system 100 of FIG. 1A, both methods can be applied to systems 150 through 180 shown in FIGS. 1B through 1E. In particular, for the system 150 of FIG. 1B, the first voltage at the first end TP1 of the load 110 is kept constant, which is substantially 0 V. The switch 132 can be controlled by a PWM signal. The switch 136 can be placed at an off state. The voltage at "DG_HB_FB1" pin, which reflects the second voltage at the second end TP2 of the load 110, can be measured. Whether open load condition exists can be determined using the first and second methods as discussed above.

For the system 160 of FIG. 1C, the first voltage at the first end TP1 of the load 110 is kept constant, which is substantially 0 V. The switch 132 can be controlled by a PWM signal. The voltage at "DG_HB_FB1" pin, which reflects the second voltage at the second end TP2 of the load 110, can be measured. Whether open load condition exists can be determined using the first and second methods as discussed above.

For the system 170 of FIG. 1D, the first voltage at the first end TP1 of the load 110 is kept constant, which is substantially VBATT. The switch 136 can be controlled by a PWM signal. The voltage at "DG_HB_FB1" pin, which reflects the second voltage at the second end TP2 of the load 110, can be measured. Whether open load condition exists can be determined using the first and second methods as discussed above.

For the system 180 of FIG. 1E, one of the switches 132 and 138 can be controlled by a PWM signal. If the switch 132 is controlled by a PWM signal, the switch 138 can be placed at an on state. The second voltage at the second end TP2 is kept constant, which is substantially 0 V. The voltage at "DG_HB_FB1" pin, which reflects the first voltage at the first end TP1 of the load 110, can be measured. If the switch 138 is controlled by a PWM signal, the switch 132 can be placed at an on state. The first voltage at the first end TP1 is kept constant, which is substantially VBATT. The voltage at "DG_HB_FB1" pin, which reflects the second voltage at the second end TP2 of the load 110, can be measure. Whether open load condition exists can be determined using the first and second methods as discussed above.

Figure 5:
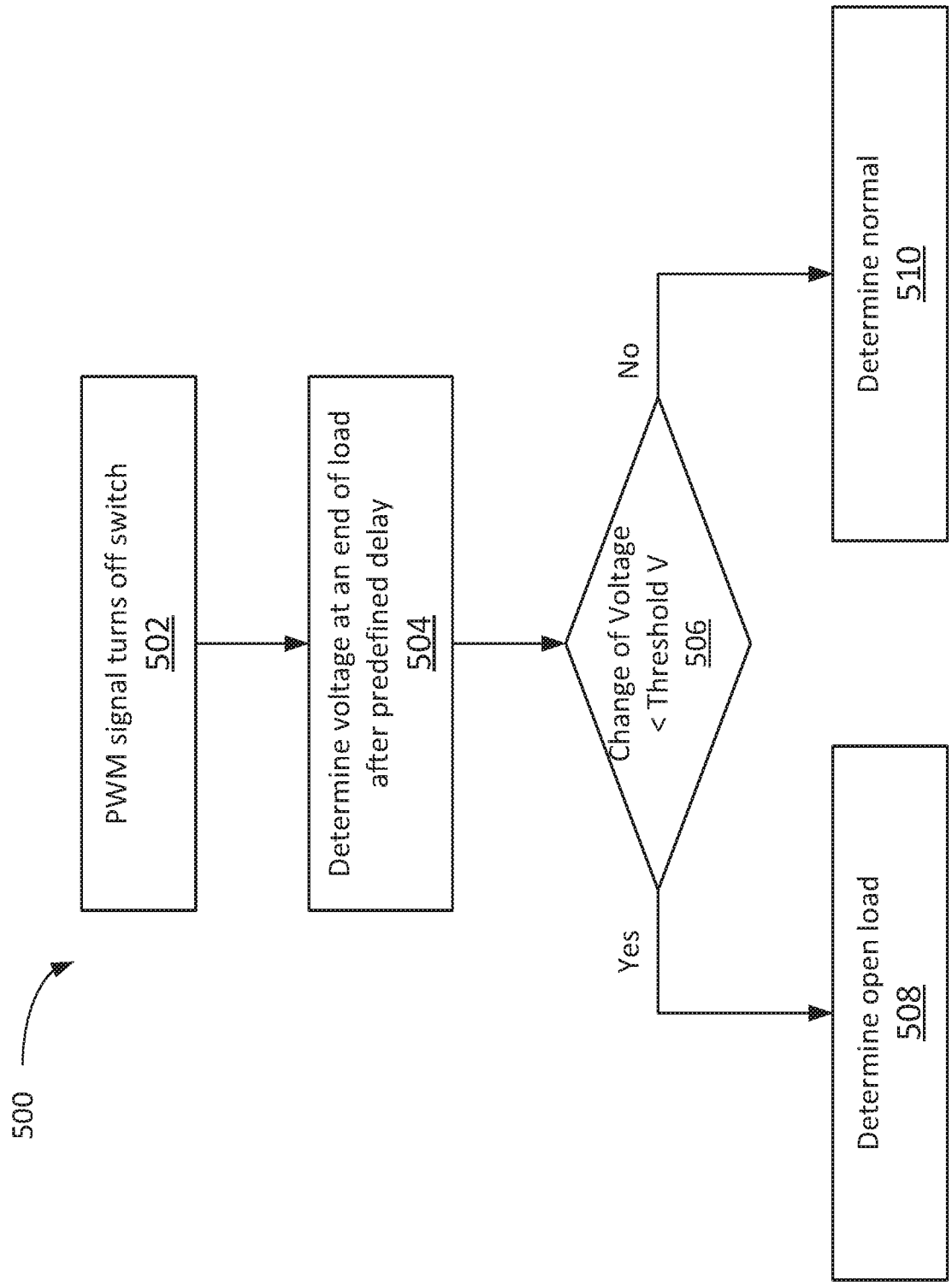
FIG. 5 is a flow diagram showing a first method for open load detection, according to an example embodiment.

Referring to FIG. 5, a flow diagram of a first method 500 for open load detection is shown, according to an example embodiment. The method can be implemented by any of the systems shown in FIGS. 1A through 1E. The load is coupled to a power source at the high side and to the ground at the low side through at least one switch. In some embodiments, there are fourth switches in an H-bridge configuration coupling the load to the power source at the high side and to the ground at the low side (e.g., FIG. 1A). In some embodiments, two switches couple the load to the power source at the high side and the load is coupled directly to the load at the low side (e.g., FIG. 1B). In some embodiments, one switch couples the load to the power source at the high side and the load is coupled directly to the load at the low side (e.g., FIG. 1C). In some embodiments, one switch couples the load to the ground at the low side and the load is coupled directly to the power source at the high side (e.g., FIG. 1D). In some embodiments, one switch couples the load to the power source at the high side and another switch couples the load to the ground at the low side (e.g., FIG. 1E).

A microcontroller is configured to control the on or off state of a first switch of the at least one switch using PWM. The load has two ends, wherein a first voltage at a first end TP1 of the load is kept constant. In some embodiments, voltage at the first end TP1 the load is kept constant, which is substantially the voltage of the power source. In other embodiments, voltage at the first end TP1 of the load is kept constant, which is substantially 0 V. The PWM signal turns on or off the first switch to selectively connect or disconnect the second end TP2 of the load to or from the power source (or the ground). The microcontroller is further configured to receive data indicative of a second voltage at the second end TP2 of the load.

At operation 502, the microcontroller outputs the PWM signal to turn off the first switch. After the first switch is turned off by the PWM signal, the load, which is an inductor type, uses its stored magnetic field energy to create a voltage to resist the sudden drop of current. The second voltage at the second end TP2 of the load would change towards the constant voltage at the first end TP1 of the load.

At operation 504, the microcontroller determines a voltage associated with the second end TP2 of the load after a predefined delay. The voltage associated with the second end TP2 can be feedback through a resistor to the microcontroller. The value of the predefined delay can be retrieved from memory, adaptively determined by the microcontroller or an external system or device, specified by a user, or received from any other data source. In some embodiments, the value of the predefined delay can be selected using knowledge of the parameters of the electrical circuit.

At operation 506, a change the voltage associated with the second end TP2 of the load since the first switch is turned off is compared to a predefined voltage threshold. The value of the predefined voltage threshold can be retrieved from memory, adaptively determined by the microcontroller or an external system or device, specified by a user, or received from any other data source. In some embodiments, the value of the predefined voltage threshold can be selected using knowledge of the parameters of the electrical circuit.

In response to the change of the voltage being less than the predefined voltage, at operation 506, the microcontroller determines that open load condition exists, at operation 508.

In response to the change of the voltage being greater than or equal to the predefined voltage, at operation 506, the microcontroller determines that no open load condition exists for the load, at operation 510.

Figure 6:
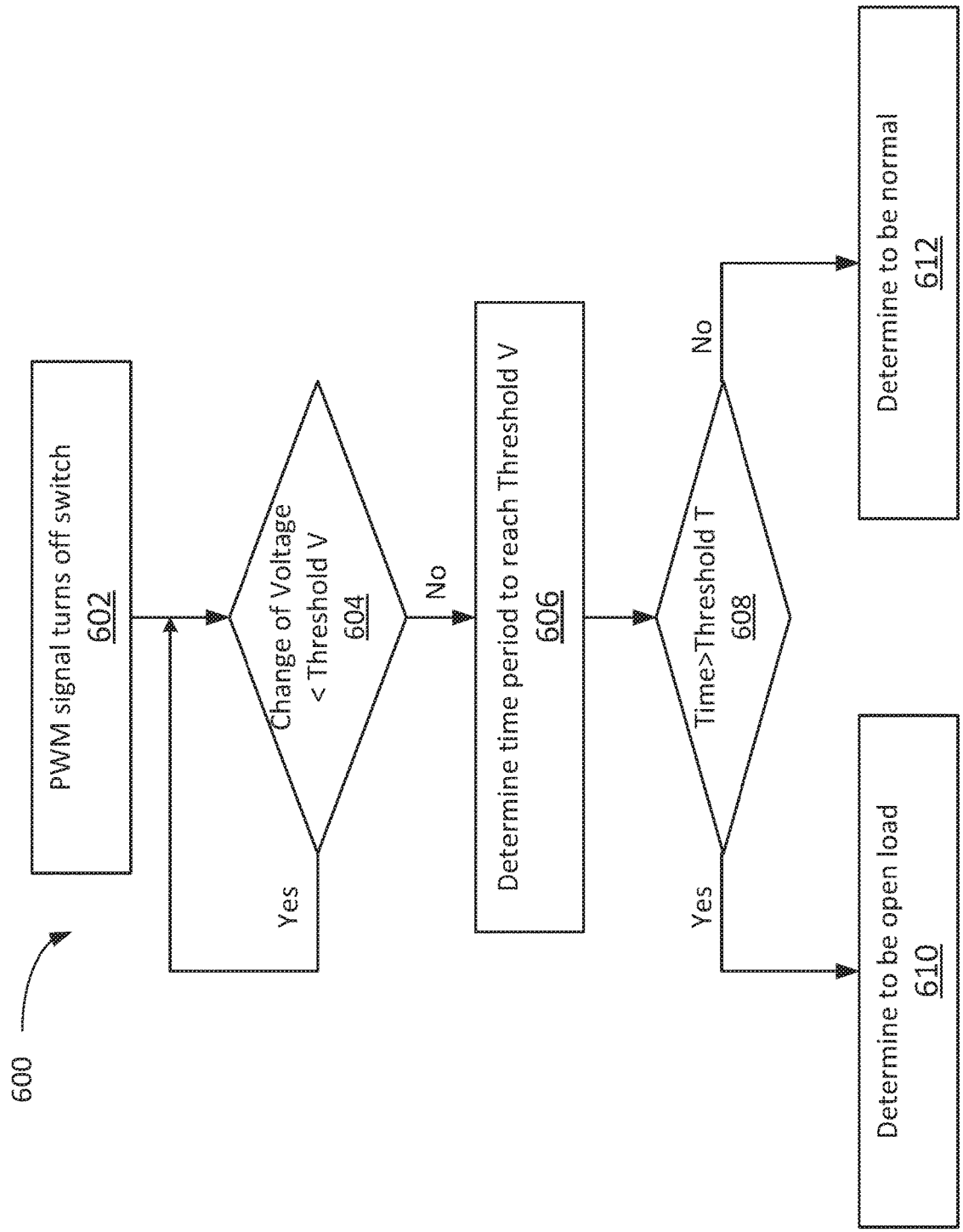
FIG. 6 is a flow diagram showing a second method for open load detection, according to an example embodiment.

Referring to FIG. 6, a flow diagram of a first method 600 for open load detection is shown, according to an example embodiment. The method can be implemented by any of the systems shown in FIGS. 1A through 1E. The load is coupled to a power source at the high side and to the ground at the low side through at least one switch (see FIGS. 1A through 1E). A microcontroller is configured to control the on or off state of a first switch of the at least one switch using PWM. The load has two ends, wherein a first voltage at a first end TP1 of the load is kept constant. The PWM signal turns on or off the first switch to selectively connect or disconnect the second end TP2 of the load to or from the power source (or the ground). The microcontroller is further configured to receive data indicative of a second voltage at the second end TP2 of the load.

At operation 602, the microcontroller outputs the PWM signal to turn off the first switch. After the first switch is turned off by the PWM signal, the load, which is an inductor type, uses its stored magnetic field energy to create a voltage to resist the sudden drop of current. The second voltage at the second end TP2 of the load would change towards the constant voltage at the first end TP1 of the load.

At operation 604, the microcontroller continually determines whether a change the voltage associated with the second end TP2 of the load since the first switch is turned off is less than a predefined voltage threshold. The voltage associated with the second end TP2 can be feedback through a resistor to the microcontroller. The value of the predefined voltage threshold can be retrieved from memory, adaptively determined by the microcontroller or an external system or device, specified by a user, or received from any other data source. In some embodiments, the value of the predefined voltage threshold can be selected using knowledge of the parameters of the electrical circuit.

In response to determining that the voltage is equal to or greater than the voltage threshold, at operation 604, the microcontroller determines a time period for the change of the voltage associated with the second end TP2 of the load to reach the predefined voltage threshold, at operation 606. In some embodiments, the microcontroller records a first time stamp of the moment when the PWM signal turns off the first switch and a second time stamp of the moment the first time the change of the voltage is equal to or greater than the predefined voltage threshold.

At operation 608, the time period is compared to a predefined time threshold. The value of the predefined time threshold can be retrieved from memory, adaptively determined by the microcontroller or an external system or device, specified by a user, or received from any other data source. In some embodiments, the value of the predefined time threshold can be selected using knowledge of the parameters of the electrical circuit.

In response to determining that the time period is longer than the threshold time period, at operation 608, the microcontroller determines that open load condition exists for the load, at operation 610.

In response to determining that the time period is shorter than or equal to the predefined time period, at operation 608, the microcontroller determines that no open load condition exists for the load, at operation 610.

As may be utilized herein, the terms "substantially," "about," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "middle," "above," "below," etc.) are merely used to describe the position of various elements in the drawings. It should be noted that the position of various elements may differ according to other exemplary embodiments, and that such variations are intended to be encompassed by the present disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

Further, reference throughout this specification to "one embodiment", "an embodiment", "an example embodiment", or similar language means that a particular feature, structure, or characteristic described in connection with the embodiment is included in at least one embodiment of the present invention. Thus, appearances of the phrases "in one embodiment", "in an embodiment", "in an example embodiment", and similar language throughout this specification may, but do not necessarily, all refer to the same embodiment.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

While this specification contains specific implementation details, these should not be construed as limitations on the scope of any inventions or of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be depicted in a particular order, this should not be understood as requiring that such operations be performed in the particular order shown or in sequential order, or that all operations be performed, to achieve desirable results. Moreover, the separation of various aspects of the implementations described above should not be understood as requiring such separation in all implementations, and it should be understood that the described methods can generally be integrated in a single application or integrated across multiple applications.

What is claimed is:

1. An apparatus for detecting an open load condition for a load, wherein the load is coupled to a power source and to a ground through at least one switch, the load has a first end and a second end, a first voltage at the first end is kept constant, the apparatus is structured to:
output a pulse width modulation (PWM) signal to selectively turn on or off a first switch of the at least one switch;
use the PWM signal to turn off the first switch at a first time point;
determine a second voltage associated with the second end of the load after a predefined delay from the first time point;
determine whether a change of the second voltage during the predefined delay is less than a predefined threshold voltage; and
in response to determining that the change is less than the predefined threshold voltage, determine that the open load condition exists for the load,
wherein the load is coupled to the ground at the first end through the first switch and at the second end through a second switch, the load is coupled to the power source at the first end through a third switch and at the second end through a fourth switch, and the apparatus is structured to:
output a Freewheeling signal to selectively turn on or off the third switch at a second time point;
wherein the predefined delay from the first time point is between the first time point and the second time point.

2. The apparatus of claim 1, wherein the load is an inductor type load, and wherein the second voltage changes towards the first voltage since the first switch is turned off at the first time point.

3. An apparatus for detecting an open load condition for a load, wherein the load is coupled to a power source and to a ground through at least one switch, the load has a first end and a second end, a first voltage at the first end is kept constant, the apparatus is structured to:
output a pulse width modulation (PWM) signal to selectively turn on or off a first switch of the at least one switch;
use the PWM signal to turn off the first switch at a first time point;
determine whether a change of a second voltage associated with the second end of the load since the first time point has reached a predefined threshold voltage;
in response to determining that the change has reached the predefined threshold voltage, determine a time period for the change to reach the predefined threshold voltage since the first time point;
determine whether the time period is greater than a predefined threshold time period; and
in response to determining that the time period is greater than the predefined threshold time period, determine that the open load condition exists for the load.

4. The apparatus of claim 3, wherein the load is an inductor type load, and wherein the second voltage changes towards the first voltage since the first switch is turned off at the first time point.

5. The apparatus of claim 3, wherein the load is coupled to the ground at the first end through the first switch and at the second end through a second switch, the load is coupled to the power source at the first end through a third switch and at the second end through a fourth switch, and the apparatus is structured to:
output a Freewheeling signal to selectively turn on or off the third switch at a second time point after the first time point.

6. The apparatus of claim 3, wherein the load is coupled directly to the ground at the first end and coupled to the power source at the second end through the first switch, and a second switch is coupled between the second end and the ground.

7. The apparatus of claim 3, wherein the load is coupled directly to the ground at the first end and coupled to the power source at the second end through the first switch.

8. The apparatus of claim 3, wherein the load is coupled directly to the power source at the first end and coupled to the ground at the second end through the first switch.

9. The apparatus of claim 3, wherein the load is coupled to the power source at the first end through the first switch and to the ground at the second end through a second switch.

10. A method for detecting an open load condition for a load, wherein the load is coupled to a power source and to a ground through at least one switch, the load has a first end and a second end, a first voltage at the first end is kept constant, the method comprising:
outputting a pulse width modulation (PWM) signal to selectively turn on or off a first switch of the at least one switch;
using the PWM signal to turn off the first switch at a first time point;
determining a second voltage associated with the second end of the load after a predefined delay from the first time point;
determining whether a change of the second voltage during the predefined delay is less than a predefined threshold voltage; and
in response to determining that the change is less than the predefined threshold voltage, determining that the open load condition exists for the load,
wherein the load is coupled to the ground at the first end through the first switch and at the second end through a second switch, the load is coupled to the power source at the first end through a third switch and at the second end through a fourth switch, and the method further comprises:
outputting a Freewheeling signal to selectively turn on or off the third switch at a second time point;
wherein the predefined delay from the first time point is between the first time point and the second time point.

11. The method of claim 10, wherein the load is an inductor type load, and wherein the second voltage changes towards the first voltage since the first switch is turned off at the first time point.

12. A method for detecting an open load condition for a load, wherein the load is coupled to a power source and to a ground through at least one switch, the load has a first end and a second end, a first voltage at the first end is kept constant, the method comprising:

outputting a pulse width modulation (PWM) signal to selectively turn on or off a first switch of the at least one switch;

using the PWM signal to turn off the first switch at a first time point;

determining whether a change of a second voltage associated with the second end of the load since the first time point has reached a predefined threshold voltage;

in response to determining that the change has reached the predefined threshold voltage, determining a time period for the change to reach the predefined threshold voltage since the first time point;

determining whether the time period is greater than a predefined threshold time period; and in response to determining that the time period is greater than the predefined threshold time period, determining that the open load condition exists for the load.

13. The method of claim 12, wherein the load is an inductor type load, and wherein the second voltage changes towards the first voltage since the first switch is turned off at the first time point.

14. The method of claim 12, wherein the load is coupled to the ground at the first end through the first switch and at the second end through a second switch, the load is coupled to the power source at the first end through a third switch and at the second end through a fourth switch, and the method further comprising:

output a Freewheeling signal to selectively turn on or off the third switch at a second time point after the first time point.

* * * * *